METHOD OF MAKING ELECTRICAL WIRING

Filed Aug. 7, 1946

Inventor
ALBERT M. HATHAWAY
By Williamson & Williamson
Attys.

Patented June 10, 1952

2,599,710

UNITED STATES PATENT OFFICE 2,599,710

METHOD OF MAKING ELECTRICAL WIRING

Albert M. Hathaway, Minneapolis, Minn.

Application August 7, 1946, Serial No. 688,900

2 Claims. (Cl. 29—155.5)

This invention relates to a method and device for electrically connecting and physically mounting a plurality of electrical units or devices in accordance with predetermined circuits and layout requirements.

In the general field of electronics including radio, telephone and electrical industries generally, it has been found highly convenient to mount a multiplicity of electrical devices and units on a common panel with the terminals of such elements or units being interconnected in accordance with predetermined circuit layouts through the media of wires, bus-bars and other metallic conductors. In such mountings and connections, the conductors are usually attached to electrical terminals by clamps, screws and soldering connections requiring labor of a skilled and careful type and the following of directions accurately to make the proper connections. In such wiring of panels and instruments, in spite of care, the connections with terminals often loosen or become displaced and on the other hand, adjustment or replacement of elements or units requires the loosening or removal of clamping devices, screws or the breaking of soldered connections, all entailing labor and considerable expense.

It is an object of my invention to provide a method for making an electrical connector system and mounting panel in accordance with various predetermined circuit layouts whereby the interconnection of the various units and elements in circuits, is very materially simplified, substantially eliminating the use of clamps, binding posts, screws and other connectors and moreover, making adjustment or removal of the various pieces of apparatus exceedingly simple.

A further object is the provision of an improved electrical wiring and mounting panel having a wide range of application to electrical circuits and responsible for a marked economy in labor and assembly cost as well as facilities for repair, adjustment and replacement.

More specifically, it is an object to provide an improved electrical connection panel and supporting media for electrical apparatus and a method of making the same wherein the conductors and connections between the units or elements are produced upon an insulating panel through the production of grooves and recesses formed in accordance with predetermined stencils and circuit layouts and wherein said grooves are filled with conductive metal and in some cases, resistive material through metal spraying in accordance with the same or revised stencil media.

These and other objects and advantages of my invention will be more apparent from the following description made in connection with the accompanying drawings, wherein like reference characters refer to similar parts throughout the several views and in which.

Figure 7:
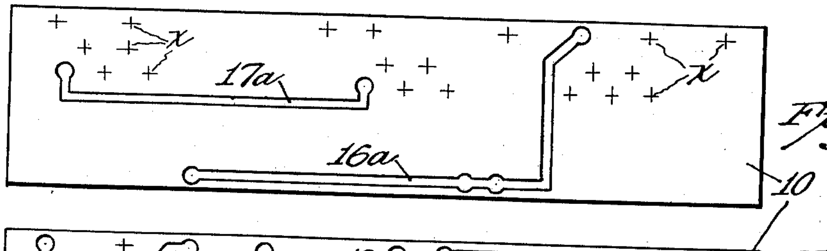
Figure 8:
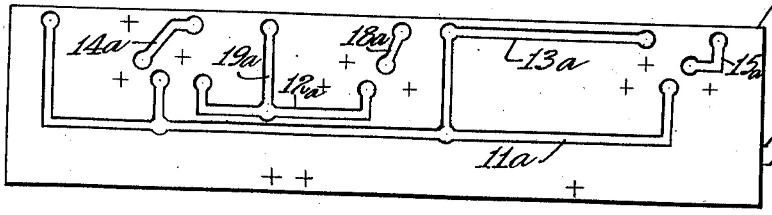

Fig. 7 is a plan view of a suitable stencil for use in my method of manufacture, both in the preparation and roughening of the spray metal receiving grooves as well as in the metal spraying step of my method, this stencil being provided for the embedding of the metallic conductors on the top face of the panel; and Fig. 8 is a plan view of a similar stencil for producing the spray metal conductors on the under or rear side of the panel.

Figure 1:
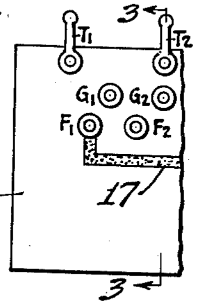
Fig. 1 is a fragmentary top plan view of a portion of an apparatus panel provided with electrical connections embodying my invention.
Figure 2:
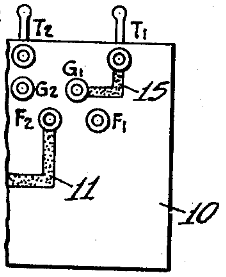
Fig. 2 is a fragmentary bottom plan view of the same portion of the panel with the metallic electrical connections embedded therein.
Figure 3:
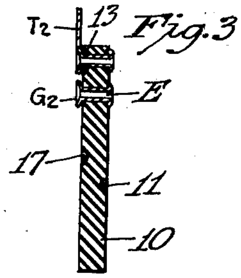
Fig. 3 is a cross section taken on the line 3—3 of Fig. 1.

In Figs. 1 to 3 inclusive, a portion of an insulating panel embodying my improved conductor system, is illustrated, the panel proper, 10, being constructed of suitable di-electric material such as laminated phenolic, composite fibrous board, Bakelite and the like, said panel having on both its upper and lower faces, grooves formed therein, preferably through stencil sand blasting process wherein are embedded metal strips 11, 13 and 17 formed by metal spraying process and preferably filling the said grooves to cause the exterior metallic surfaces to be disposed substantially flush with the faces of the panel.

The grooves and metal conductive strips 11, 15 and 17 are laid out in conformance to a predetermined circuit layout with the positioning of the metallic conductors and the lengths thereof being suitable for connection of the terminals or terminal wires of the electrical apparatus to be used in the particular circuit. Where the apparatus is to be located on the two faces of the panel, terminal enlargements in the grooves such as the terminal F–1 on the upper face of the panel and the terminal F–2 on the under face of the panel, are formed in the sand blasting or other recessing of the panel faces, preferably through the use of stencils causing disc-shaped recesses to be produced which recesses, during the metal spraying step as will later be more fully described, are filled with spray metal. In many instances, it is desirable to interconnect conductor strips formed on opposite faces of the panel and to this end, I provide tubular eyelets E which are upturned at their inner ends and which pass through suitable receiving apertures drilled or punched through the thickness of the panel, the outer ends of said eyelets being headed for engagement with the disc-like enlargements of the conductive strips. I have also found it advantageous to utilize for input and output connectors of a circuit, lug-equipped terminal eyelets T–1, T–2, T–3, etc., which eyelets are of generally similar structure to the eyelets E but may have radially extending attachment lugs for soldering connection with wires or other input or output conductors. The inner ends of said terminal eyelets are spread or outturned and clinched to the underside of the panel in the manner of eyelets E.

The method of manufacture of the improved electrical connector system and panel, is essentially as follows:

A circuit layout for the points of connection of conductors with terminals of the various pieces of electrical equipment and output and input connections, is first laid out in accordance with the requirements of the size of apparatus to be mounted upon the panel and the spaced arrangement and connections thereof, the layout accurately including the configuration, widths and positioning of the various grooves, terminal disc recesses and eyelet-accommodating apertures for the actual panel. A stencil of tough, preferably flexible sheet material such as masking tape, is then cut from the pattern of the layout, slots and enlargements, as shown in Fig. 7 being formed in the stencil as well as enlargements for connector portions of the metallic conductors to be sprayed. If desired, the stencil may also include circular apertures for surrounding the drilled apertures in the panel.

Such a stencil, for the top face of the panel, is illustrated in Fig. 7 and a similar stencil for the bottom face of the panel is illustrated in Fig. 8.

In accordance with my method, a panel of proper size for the layout intended is first cut and thereafter drilled or punched according to the required number and positioning of the eyelets indicated on the layout.

Thereafter, the stencil for one face of the panel is adhesively applied thereto and the stencil for the opposite face of the panel may at that time or at a subsequent time, be applied to the opposite face, care being taken to properly register the two stencils to cause terminal portions of the slots to be properly aligned in the finished product.

The panel with the stencil or stencils mounted thereon is next sand blasted by exposing the stencil-covered faces successively or simultaneously to a blast of sand from a suitable sand gun. Sand blasting is quite well known in many industries and description of apparatus and materials for such is therefore here unnecessary. It is important however, to note that the size of the sand or other abrasive utilized in the blasting step may be varied in accordance with the requirements of roughening the grooves formed, in accordance of course, with the best efficiency in view of the material of the panel.

The sand blasting produces the grooves and recesses and is carried on to the extent of obtaining the depths of grooves calculated and required.

Thereafter, the grooved and recessed panel with the stencils still mounted on the outer faces thereof, is metalized by spraying molten metal from a conventional metalizing spray gun against the respective faces of the panel through the stencils. The metal spraying is continued preferably to the point where the grooves and recesses are filled substantially flush with the outer faces of the panel.

Thereafter, the stencils are removed and may be reused for similar panels of the same circuit layout.

The eyelets are then inserted or staked and clinched on the underside of the panel with terminal lug-equipped eyelets being properly related to dispose their radial connector lugs in accordance with the layout. The panel and conductor system embedded therein is thus complete and is ready for mounting and electrical connection of the pieces of apparatus of the circuit.

I have found that the stencil and said blasting step of my method is important since it produces somewhat roughened surfaces in the grooves and recesses formed which very effectively receive and retain the particles of metal sprayed in the next or metal spraying step of my method, eliminating possibility of peeling or loosening under vibration and other conditions.

Figure 4:
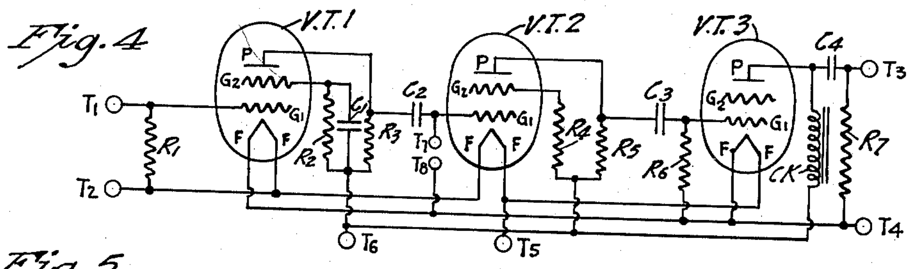
Fig. 4 is a schematic electrical diagram of the circuit used upon the complete amplifier panel.

In the schematic circuit diagram of Fig. 4, an electrical circuit for conventional, small amplifiers such as are used in hearing aids, is illustrated. This circuit involves a three tube resistance-coupled amplifier with an impedance output coupling. This amplifier is designed to be fed by a crystal microphone and to operate a crystal receiver of the earphone type. The component parts, as shown, consist of three pentode vacuum tubes VT–1, VT–2 and VT–3 respectively of the small, flat type manufactured by the Raytheon Corporation of Newton, Mass.; also seven one quarter watt resistors, R1, R2, etc. of the type manufactured by the Carborundum Co. of Niagara Falls, N. Y.; also four condensers, C1, C2, etc. of the type furnished hearing aid manufacturers by the Solar Manufacturing Co., of Newark, N. J.; and one choke coil CK of the type supplied for hearing aid manufacturers by the Standard Transformer Company of Chicago, Illinois.

Figure 5:
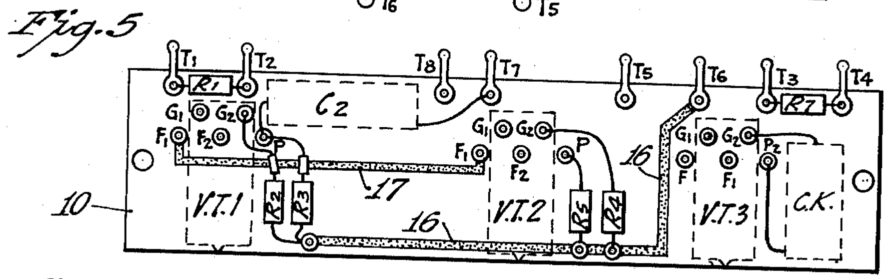
Fig. 5 is a top plan view of the electrical connections at the top side of the panel for the complete circuit with electrical devices and pieces of apparatus indicated in their connected positions by dotted lines.
Figure 6:
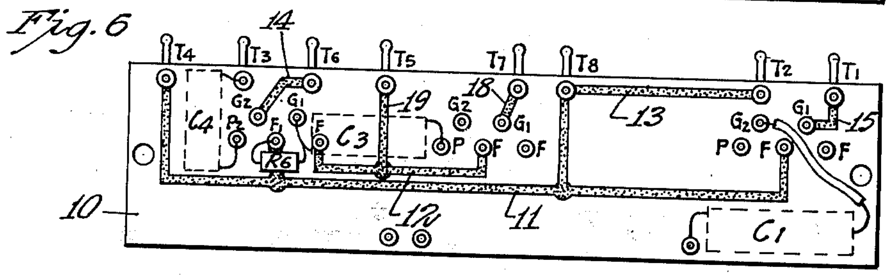
Fig. 6 is a similar bottom plan view of the complete amplifier panel, the panel being turned end for end.

These component pieces of apparatus are shown in Figs. 5 and 6 as mounted upon the faces of a panel 10 of laminated phenolic material. The principal conductors of the circuit are supplied by the method and structure embodying my invention. Thus, in Fig. 6, I provide on the bottom face of the panel, the elongated, end-angled, metal sprayed conductor 11, extending substantially the full length of the panel and having the enlarged terminal portions and also enlarged, junction wherein a second right angled conductor 13 intersects the same. The ends of conductor 11 are electrically connected with the eyelets E previously described, which extend through and are staked to the panel, one of said eyelets being electrically connected at the top of the panel with the terminal T–4 which constitutes one of the output terminals of the circuit and also constitutes a battery terminal. The opposite end of conductor 11 is connected with one of said eyelets which is staked to the panel and is electrically connected by soldering or otherwise, with one of the terminals of vacuum tube V. T. 1.

The embedded metal sprayed conductor 12 connects terminal of vacuum tube V. T. 3 with the terminal of vacuum tube V. T. 2 and also provides a junction with the transversely disposed metal sprayed conductor 19, the other end of which is electrically connected with a terminal eyelet having an outwardly extending lug for external electrical connection with a battery.

The short metal-sprayed conductor 14 at the left hand portion of the panel shown in Fig. 6 merely extends between a staked eyelet G2 and a staked terminal eyelet T–6, the former of which is electrically connected by soldering or otherwise at the top or reverse side of the panel with a vacuum tube lead wire from the vacuum tube VT–3 and with a choke coil lead wire from CK. In this connection, it will be noted (see also Fig. 5) that the eyelet terminal T–6 electrically connects on the top side of the panel with the embedded metal-sprayed conductor 16 having electrical connection with terminals of resistors R4 and R5 and having at its opposite extremity, an eyelet providing electrical connection for terminals of the two resistor elements R2 and R3, thus transferring current from one side of the panel to the other side without utilizing wires or separate connector elements.

The other physical and electrical connections on the upper and lower faces of the panel, as illustrated in Figs. 5 and 6, are readily understandable in light of the foregoing description by reference to the said figures and with further reference to the diagram of Fig. 4.

The terminal wires of the pieces of apparatus or elements are directly connected by soldering with the appropriate ends of the eyelets E and terminal eyelets T–1, T–2, etc. or they may be directly connected by soldering to points on the metal-sprayed conductors or to the enlargement disc portions formed therein. This eliminates the use of bus bars, wires and generally reduces the chances of error in correctly assembling and connecting the pieces of apparatus. The ends of terminal wires may be projected into the appropriate eyelet ends and a drop of solder placed upon the parts in contact, this solder serving also to cover the end of the eyelet and to work between the under flange of the eyelet and the metalized conductor therebelow, to exclude air from the electrical connection and to thus minimize corrosion.

In commercial application of my method, after the layout and stencils are predetermined and cut, the eyelet receiving apertures are preferably formed by a punching or drilling jig wherein the elements are set in conformity to the required demands. The entire panel may be perforated as desired prior to application of the stencils, in one operation.

In manufacturing comparatively few, highly specialized panels, it may be desirable to include upon the stencil as is shown, crosses, the intersecting points of which mark the drilling centers for forming the eyelet-receiving apertures. Such indicia on the stencil is indicated in the Figs. 7 and 8 by the crosses X. In such instances, the apertures may be individually drilled through the panel with the stencils still attached after the sand blasting and metalizing steps.

In the stencils shown in Figs. 7 and 8, the respective slots in the stencils are numbered *11a*, *12a*, *13a*, etc in conformance with the conductive strips subsequently formed through the sand blasting and metalizing steps of my process.

With my improved method and panel construction, the electrical element or pieces of apparatus require no binding posts or other terminals and the short terminal wires supplied by apparatus of this type extend only from the apparatus to very closely adjacent conductive strips or eyelets which are embedded in the panel itself. Elimination of numerous dangling wire conductors with the attendant inaccuracy of assembly, is thus effected with a very material saving in labor cost.

My invention has very wide applicability in the electrical field being capable of use on very small, compact installations and circuits as well as in large installations to replace heavy bus bars, terminal posts and cables in high amperage circuits.

With my method of manufacture, a very wide range of di-electric materials or sheets may be successfully utilized including a wide range of plastic materials, various insulating boards and fabrics, ceramics and other di-electric compositions.

The term "sand-blasting" as used herein and in the appended claims includes the blasting of any hard, abrasive particles such as steel or other hard metallic particles, carbon, sand, etc.

It will of course, be understood that various changes may be made in the form, details, arrangement and proportions of the parts without departing from the scope of my invention.

What I claim is:

1. The method of making a combined mounting and electrical conductor system for interconnecting a number of pieces of electrical apparatus which consists in sand-blasting narrow areas of at least one face of a di-electric panel to inherently form therein a plurality of roughened shallow grooves conforming in shape, length and arrangement to a predetermined circuit layout and constituting spray metal molds and retaining elements, then spraying metal into said grooves to fill the same and be molded by said grooves and to form continuous and conductive strips in each of said grooves and with the face of said panel between said grooves exposed and uncoated by spray metal.

2. The method of making a combined mounting and electrical conductor system for interconnecting a number of pieces or devices of electrical apparatus which consists in providing a di-electric panel with openings therein for eyelet terminals applying and maintaining a stencil having circuit-defining slots and eyelet openings in the circuit forming slots on the panel, sand blasting one or more roughened surface shallow circuit-forming grooves in the said panel by directing the sand-blast through the said slots in the stencil, spraying metal through the slots in the said stencil into the one or more grooves and filling the said grooves with the said metal so that the metal is substantially flush with the surface of the said panel, and the said sprayed metal in the grooves is permanently bonded therein by means of the roughened surface of the grooves and forms one or more fixed conductive strips substantially flush with the surface of the panel, removing the stencil and applying eyelet terminals in the said openings.

ALBERT M. HATHAWAY.

REFERENCES CITED

The following references are of record in the file of this patent:

UNITED STATES PATENTS

| Number | Name | Date |
|---|---|---|
| 1,509,186 | Benner et al. | Sept. 23, 1924 |
| 1,536,749 | Austin | May 5, 1925 |
| 1,563,731 | Ducas | Dec. 1, 1925 |
| 1,614,263 | Spencer | Jan. 11, 1927 |
| 1,713,951 | Danielson | May 21, 1929 |
| 1,837,678 | Ryder | Dec. 22, 1931 |
| 2,066,511 | Arlt | Jan. 5, 1937 |
| 2,145,842 | Waterman | Jan. 31, 1939 |
| 2,297,488 | Luderitz | Sept. 29, 1942 |
| 2,427,144 | Jansen | Sept. 9, 1947 |

FOREIGN PATENTS

| Number | Country | Date |
|---|---|---|
| 19,919 | Great Britain | 1892 |
| 570,877 | Great Britain | July 26, 1945 |